United States Patent [19]

Seppänen et al.

[11] Patent Number: 5,677,069
[45] Date of Patent: Oct. 14, 1997

[54] PLASTIC MATERIAL FOR PACKAGING

[75] Inventors: Hanneli Seppänen, Helsinki; Torvald Vestberg, Porvoo; Markku Sainio, Porvoo; Lars-Åke Mattsson, Porvoo, all of Finland

[73] Assignee: Borealis Holding A/S, Lyngby, Denmark

[21] Appl. No.: 433,517

[22] PCT Filed: Nov. 3, 1993

[86] PCT No.: PCT/FI93/00446

§ 371 Date: May 12, 1995

§ 102(e) Date: May 12, 1995

[87] PCT Pub. No.: WO94/11434

PCT Pub. Date: May 26, 1994

[30] Foreign Application Priority Data

Nov. 13, 1992 [FI] Finland ................ 925182

[51] Int. Cl.$^6$ ........................... B32B 27/30
[52] U.S. Cl. ............ 428/522; 428/100; 428/515; 525/70; 525/73; 525/77; 525/80; 427/388.1; 427/389.9; 427/391; 427/393.5
[58] Field of Search ............... 428/522, 500, 428/515; 525/70, 73, 77, 80; 427/388.1, 389.9, 391, 393.5

[56] References Cited

U.S. PATENT DOCUMENTS

| | | |
|---|---|---|
| 4,759,984 | 7/1988 | Hwo . |
| 5,164,456 | 11/1992 | Vestberg et al. . |
| 5,223,311 | 6/1993 | Tsutsumi et al. ............... 427/388.1 |
| 5,300,578 | 4/1994 | Vestberg et al. . |
| 5,312,872 | 5/1994 | Vestberg et al. . |

FOREIGN PATENT DOCUMENTS

| | | |
|---|---|---|
| 0178061 | 4/1986 | European Pat. Off. . |
| 0213698 | 3/1987 | European Pat. Off. . |
| 0255238 | 2/1988 | European Pat. Off. . |
| 0300104 | 1/1989 | European Pat. Off. . |
| 0318025 | 5/1989 | European Pat. Off. . |
| 894461 | 9/1989 | Finland . |
| 904586 | 9/1990 | Finland . |
| 920359 | 1/1992 | Finland . |

Primary Examiner—James J. Seidleck
Assistant Examiner—Duc Truong
Attorney, Agent, or Firm—Birch, Stewart, Kolasch & Birch, LLP

[57] ABSTRACT

The invention relates to sealable and peelable polymer composition which comprises 5–35 weight-% styrene modified ethylene copolymer and 95–65 weight-% ethylene butyl acrylate copolymer. Ethylene copolymer is preferably ethylene butylacrylate copolymer (E/BA) or ethylene vinyl acetate copolymer (E/VA).

28 Claims, No Drawings

PLASTIC MATERIAL FOR PACKAGING

This application is a 371 of PCT/FI93/00446 filed Nov. 3, 1993.

The present invention relates to a peelable polymer composition, a method for making the composition and films, sheets and lamination and coating products made from it.

In the packaging industry it is conventional that a product is packaged in a plastic film or a rigid plastic package and the package is heat sealed. The seal must possess a mechanical resistance sufficient to maintain the tight-seal properties during storage and transport. It is required that the package can be opened without destroying the product inside but to a growing extent it must also be possible to open the package without destroying the integrity of the film itself. The seal must be easily openable by pulling with hands without scissors or other instruments, the seal must be peelable. The package can also be used after opening for instance as a serving or heating disc (yoghurt, micro-oven food) or as a product holder where the product is kept in the opened package (candies, cereals).

The peelable seal can be defined to be the seal or joint between two films or sheets produced by heat sealing or impulse sealing, the joint thus formed having the property of being openable by pulling with hands. The seal can be between two films or two sheets or between a film or sheet and some substrate. Depending on the substrate, an adhesion layer may sometimes be needed between the layers in the sheet or film.

The use of peelable seals in different packages has become more common with the development of packaging techniques. There is a special need in the food processing industry, where there are applications in all sections, e.g. dairy products (cheeses, yoghurt), frozen food products, ready-processed food, canned food, meat and meat products, different snack and sweet packages. A very fast growing group is ready processed food and canned food which is heated mainly in a microwave oven.

In peelable compositions, the most commonly used component has been polybutylene and another has been ethylene polymer, most often ethylene-vinyl acetate copolymer (E/VA) or low density polyethylene (LDPE). Also polypropylene can be included in the compositions. For instance U.S. Pat. No. 4,759,984 describes a polymer composition, where the main component is E/VA (75–92 w-%) and minor amounts of polybutylene (6–25 w-%) and polypropylene (2–15 w-%) have been blended to it. Polyamide or polycarbonate are the most suitable substrates.

In the patent application EP 213.698, a composition is disclosed, which consists of more than 50 w-% of polybutylene and the rest is polypropylene and an ethylene polymer (EVA, HDPE, LDPE, LLDPE). European patent 178.061 describes a polymer blend containing 65–85 w-% homo- or copolymer of ethylene (preferably LDPE or EVA), 5–30 w-% polybutylene and 3–15 w-% propylene polymer.

In patent publication EP196,727 multilayer structure is described in which one layer is a polymer blend comprising 65–95 w-% linear low density polyethylene (LLDPE) and 5–35 w-% polypropylene and/or polyisobutylene.

The purpose of the present invention is to achieve a novel polymer composition, which is sealable and peelable. The polymer composition according to the invention comprises a blend of 5–35 weight-% ethylene copolymer modified with styrene and 95–65 weight-% ethylene butylacrylate copolymer. Preferably, the ethylene copolymer is ethylene butylacrylate or ethylene vinylacetate copolymer. The butylacrylate content of the ethylene butylacrylate copolymer can be 5–30 weight-%, preferably 16–18 weight-%. The vinyl acetate content in ethylene vinylacetate copolymer is 10–30 weight-%.

Ethylene copolymer can be modified with styrene by all conventional grafting methods or preferably by impregnating styrene and a free-radical initiator into the ethylene polymer and polymerising thereafter at a elevated temperature. Impregnation can be made without water, by addition of some water or by addition of water when more than half of the styrene has impregnated into polyolefin particles or all the time in the presence of great amounts of water. Polymerisation is made in water suspension. A preferred method for styrene modification is described in Finnish patents 85496, 86642 and 88170. Styrene content in the modified ethylene copolymer is 10–70 weight-%, preferably 40–60 weight-%.

The polymer composition is made by conventional compounding methods like melt compounding in one- or twin-screw extruder or in Banbury mixer. Also dry blending can be used.

The polymer composition can also contain small amounts of conventional polymer additives such as antioxidants, antiblocking agents, antistatic agents etc.

The composition according to the invention can be used in manufacturing conventional packages containing peelable seals. From the polymer composition can be produced blown or cast films or sheets and lamination and coating products which are peelable. Also multilayer structures in which one layer is made of a film or sheet of the composition can be produced. It is typical for the products according to the invention that they have very high heat resistance in processing which is extremely preferable in co-extrusion coating.

Peelable material described here can be sealed onto conventional cup or tray materials used in packages, like polypropylene, polyethylene, polystyrene and PVC. Also paperboard coated with plastic, e.g. polyethylene, can be used.

The invention is described more in detail in the following examples.

The peeling temperatures and seal strengths of the polymer compositions according to the invention were investigated. Applications were extrusion coating, blown films and cast films. The following plastic materials were used in the experiments:

LD-polyethylene=NCPE 4524
HD-polyethylene=NCPE 1910
Ethylene butyl acrylate copolymer, E/BA=NCPE 6417, 17% acrylate
Polypropylene, PP=VB 8052C
Ethylene vinyl acetate copolymer, E/VA=NCPE 5118, 18% vinyl acetate
E/BA grafted with styrene, SEBA=NCPE 5470, styrene content 50%
E/VA grafted with styrene=SEVA, styrene content 50%

All above mentioned materials are produced by Neste Chemicals. The most important properties are given in table 1.

TABLE 1

Properties of materials

| polymer | melt flow index, g/10 min (190° C.) | melting point °C. |
|---|---|---|
| NCPE 4524 | 4.5 | 112 |
| NCPE 1910 | 0.5 | 125 |
| VB 8052C | 8.0 | 160 |
| NCPE 64 | 7.0 | 100 |
| NCPE 5118 | 2.0 | 85 |
| NCPE 5470 | 1.5 | 85 |
| SEVA | 1.5 | 95 |

EXAMPLE 1

A series of sealing samples were made in a Beloit extrusion coating line. The temperature for polyethylene (LDPE) was 320° C. and for peelable blends 280° C. Speed was 100 m/min. The thickness of the LDPE layer was 15 g/m$^2$ and of the peelable layer 25 g/m$^2$.

Sealing samples were the following:
1. Paper/LDPE/90% E/BA+10% SEVA
2. Paper/LDPE/85% FUBA+15% SEVA
3. Paper/LDPE/80% E/BA+20% SEVA
4. Paper/LDPE/90% E/BA+10% SEBA
5. Paper/LDPE/85% E/BA+15% SEBA
6. Paper/LDPE/80% E/BA+20% SEBA Lids with a diameter of 75 mm were cut from the samples and they were sealed to polypropylene and polystyrene cups with KOPP's laboratory sealing machine. So called flat cup sealing heads were used. Sealing time was 0,5 s and sealing pressure 0,5 N/mm$^2$. Results are given in Tables 2 and 3. From the results in Table 2, it can be seen that when sealing is made to polypropylene cups the seal strength is weakening but peelability is improving if EBA content is growing. From the results in Table 3, it is seen that that, with polystyrene cups, seal strengths are lower than with polypropylene cups but the strengths remain equal even if sealing temperatures are raised. Peelability is better than with polypropylene cups. The temperature area when the seal was peelable is for polypropylene cups about 140°–160° C. and for polystyrene cups about 120°–160° C. Temperature area depends from the composition of the polymer blend.

TABLE 2

Extrusion coating, polypropylene cup. Sealability and seal strengths.

| Test n:o | Temperature °C. | Opening strength (in the beginning) N | Peeling strength (later) N | peelability |
|---|---|---|---|---|
| 1 | 130 | 0.6 | 0.3 | not sealing |
|   | 140 | 1.8 | 0.8 | not sealing |
|   | 150 | 6.0 | 3.1 | peelable |
|   | 160 | 7.8 | 1.9 | peelable |
| 2 | 130 | 0.9 | 0.3 | not sealing |
|   | 140 | 2.3 | 0.6 | peelable |
|   | 150 | 6.3 | 1.2 | peelable |
|   | 160 | 4.7 | 2.1 | peelable |
| 3 | 130 | 0.5 | 0.1 | nor sealing |
|   | 140 | 1.9 | 0.5 | peelable |
|   | 150 | 3.3 | 1.3 | peelable |
|   | 160 | 4.7 | 1.6 | peelable |
| 4 | 130 | 1.0 | 0.5 | not sealing |
|   | 140 | 3.1 | 0.7 | peelable |
|   | 150 | 6.6 | 1.7 | peelable |
|   | 160 | 7.2 | 1.8 | peelable |
| 5 | 130 | 1.1 | 0.4 | not sealing |
|   | 140 | 2.3 | 0.9 | peelable |
|   | 150 | 4.1 | 1.8 | peelable |
|   | 160 | 8.3 | 1.3 | peelable |
| 6 | 130 | 0.6 | 0.3 | not sealing |
|   | 140 | 1.5 | 1.0 | peelable |
|   | 150 | 4.0 | 1.3 | peelable |
|   | 160 | 6.9 | 0.1 | peelable |

TABLE 3

Extrusion coating, polystyrene cup. Sealability and seal strengths.

| Test No. | Temperature °C. | Opening strength (in the beginning) N | Peeling strength (later) N | peelability |
|---|---|---|---|---|
| 1 | 120 | 0.8 | 0.6 | not sealing |
|   | 130 | 1.3 | 0.8 | peelable |
|   | 140 | 2.2 | 1.5 | peelable |
|   | 150 | 2.8 | 1.2 | peelable |
|   | 160 | 2.4 | 1.5 | peelable |
| 2 | 120 | 1.3 | 0.8 | not sealable |
|   | 130 | 2.3 | 1.1 | peelable |
|   | 140 | 2.4 | 1.5 | peelable |
|   | 150 | 2.3 | 1.6 | peelable |
|   | 160 | 3.0 | 1.7 | peelable |
| 3 | 120 | 1.5 | 0.9 | peelable |
|   | 130 | 1.8 | 1.1 | peelable |
|   | 140 | 1.9 | 1.2 | peelable |
|   | 150 | 1.5 | 1.1 | peelable |
|   | 160 | 3.8 | 1.3 | peelable |
| 4 | 120 | 1.2 | 0.6 | peelable |
|   | 130 | 1.5 | 0.9 | peelable |
|   | 140 | 1.6 | 0.9 | peelable |
|   | 150 | 1.8 | 1.0 | peelable |
|   | 160 | 2.6 | 1.3 | peelable |
| 5 | 120 | 1.2 | 0.5 | peelable |
|   | 130 | 1.4 | 0.8 | peelable |
|   | 140 | 1.5 | 0.7 | peelable |
|   | 150 | 1.3 | 0.9 | peelable |
|   | 160 | 2.4 | 1.1 | peelable |
| 6 | 120 | 0.8 | 0.5 | not sealable |
|   | 130 | 1.3 | 0.5 | peelable |
|   | 140 | 1.6 | 0.9 | peelable |
|   | 150 | 2.2 | 1.3 | peelable |
|   | 160 | 2.4 | 1.1 | peelable |

EXAMPLE 2

20 weight-% styrene grafted ethylene butyl acrylate copolymer (SEBA) and 80 weigth-% ethylene butyl acrylate copolymer (E/BA) were dry blended. With Reifenhäuser blown film line a two-layer film was made, which had HD-polyethylene (NCPE 1910) as substrate and the above mentioned polymer blend as peelable layer. The thickness of the substate layer was 150 µm and the thickness of the peelable layer 30 µm. The blow-up ratio in film blowing was 2.5. The temperature profile of HD-polyethylene extruder was 190-210-210-220-220-220-220-220 and of the extruder for peelable blend 150-170-170-180-190-220-220-220, when the temperature in die was 220° C.

Lids with 75 mm diameter were cut from the films and they were sealed with KOPP's laboratory sealing machine with a profiled cup sealing head (depth of profile 0.1 mm, width 1.2 mm). Sealing time was 0.5 s and sealing pressure 0.5 N/mm$^2$. Peelable temperature area of the polypropylene cup was 195°–210° C. The opening strength was 5–9N. More accurate results are given in Table 4.

TABLE 4

Blown film. Sealability and seal strengths.

| Temperature °C. | Opening strength (in the beginning) N | Peeling strength (later) N | peelability |
|---|---|---|---|
| 190 | 1.8 | 0.6 | not sealable |
| 195 | 4.5 | 1.2 | peelable |
| 200 | 9.5 | 1.0 | peelable |
| 210 | 9.1 | 1.5 | peelable |
| 215 | 12.4 | 1.8 | seal |

EXAMPLE 3

20 weight-% styrene grafted ethylene bytyl acrylate copolymer (SEBA) and 80 weight-% ethylene butyl acrylate copolymer (E/BA) were dry blended. With ER-WE-PA-cast film line a two-layer film was made, which had polypropylene (VB 8052C) as a substrate and the above mentioned polymer blend as a peelable layer. The thickness of the substate was 35 μm and the thickness of the peelable layer was 15 μm. The temperature profile of the polypropylene extruder was 190-200-210-220-230-230 and the temperature in the die was 240° C. The temperature profile of the peelable layer in the extruder was 190-200-200-205-210-210 and temperature in the die 219° C.

The peelability of the film was tested by sealing the film onto itself with KOPP's laboratory sealing machine with flat sealing head. The width of the sealing head was 10 min. The temperature area where the seal was peelable was 80°–110° C. The more accurate results are given in Table 5.

TABLE 5

Cast film. Sealability and seal strengths

| Temperature °C. | Seal strength N | peelability |
|---|---|---|
| 70 | 0.7 | not sealable |
| 80 | 6.5 | peelable |
| 90 | 10.1 | peelable |
| 100 | 11.7 | peelable |
| 110 | 11.3 | peelable |

We claim:

1. A sealable and peelable polymer composition which comprises (A) 5–35 weight-% of an ethylene copolymer grafted with styrene and (B) 95–65 weight-% of an ethylene butyl acrylate copolymer.

2. The composition according to claim 1, wherein said ethylene copolymer is an ethylene butyl acrylate copolymer.

3. The composition according to claim 2, wherein said ethylene butyl acrylate copolymer of component (A) contains 5–30 weight-% butyl acrylate.

4. The composition according to claim 1, wherein said ethylene copolymer is an ethylene vinyl acetate copolymer.

5. The composition according to claim 4, wherein said ethylene vinyl acetate copolymer contains 10–30 weight-% vinyl acetate.

6. The composition according to any one of claims 1–5, wherein the component (A) is contained in an amount of 15–25 weight-% and the component (B) is contained in an amount of 85–75 weight-%.

7. The composition according to any one of claims 1–5, wherein the polystyrene content in the grafted ethylene copolymer is 10–70 weight-%.

8. The composition according to claim 6, wherein the polystyrene content in the grafted ethylene copolymer is 10–70 weight-%.

9. The composition according to claim 7, wherein the polystyrene content in the grafted ethylene copolymer is 40–60 weight-%.

10. The composition according to claim 8, wherein the polystyrene content in the grafted ethylene copolymer is 40–60 weight-%.

11. The composition according to claim 1, wherein said ethylene butyl acrylate copolymer of component (B) contains 16–18 weight-% of butyl acrylate.

12. The composition according to claim 6, wherein said ethylene butyl acrylate copolymer of component (B) contains 16–18 weight-% of butyl acrylate.

13. A sealable and peelable polymer composition which comprises (A) 5–35 weight-% of an ethylene butyl acrylate copolymer grafted with styrene or an ethylene vinyl acetate copolymer grafted with styrene and (B) 95–65 weight-% of an ethylene butyl acrylate copolymer.

14. The composition according to claim 13, wherein said ethylene butyl acrylate copolymer of component (A) contains 5–30 weight-% butyl acrylate.

15. The composition according to claim 13, wherein said ethylene vinyl acetate copolymer contains 10–30 weight-% vinyl acetate.

16. The composition according to any one of claims 13–15, wherein the component (A) is contained in an amount of 15–25 weight-% and the component (B) is contained in an amount of 85–75 weight %.

17. The composition according to any one of claims 13–15, wherein the polystyrene content in the grafted component (A) is 10–70 weight-%.

18. The composition according to claim 16, wherein the polystyrene content in the grafted component (A) is 10–70 weight-%.

19. The composition according to claim 17, wherein said polystyrene content is 40–60 weight-%.

20. The composition according to claim 18, wherein said polystyrene content is 40–60 weight-%.

21. A process for preparing a sealable and peelable polymer composition which comprises mixing together (A) 5–35 weight-% of an ethylene copolymer grafted with styrene and (B) 95–65 weight-% of an ethylene-butyl acrylate copolymer, wherein said mixing is performed by compounding in a melt phase or by dry blending.

22. A process for preparing a sealable and peelable polymer composition which comprises mixing together (A) 5–35 weight-% of an ethylene butyl acrylate copolymer grafted with styrene or an ethylene vinyl acetate copolymer grafted with styrene and (B) 95–65 weight-% of an ethylene-butyl acrylate copolymer, wherein said mixing is performed by compounding in a melt phase or by dry blending.

23. A packaging film or sheet which is manufactured from a polymer composition according to any one of claims 1–5 and 13–15.

24. A packaging film or sheet which is manufactured from a polymer composition according to claim 7.

25. A packaging film or sheet which is manufactured from a polymer composition according to claim 17.

26. A layered structure which comprises at least one layer which is manufactured from a polymer composition according to any one of claims 1–5 and 13–15.

27. A layered structure which comprises at least one layer which is manufactured from a polymer composition according to claim 7.

28. A layered structure which comprises at least one layer which is manufactured from a polymer composition according to claim 7.

* * * * *